US011859475B2

(12) United States Patent
Beck et al.

(10) Patent No.: US 11,859,475 B2
(45) Date of Patent: Jan. 2, 2024

(54) SEAL BAG FOR SEAL OF AN ELECTRIC SUBMERSIBLE PUMP

(71) Applicant: Halliburton Energy Services, Inc., Houston, TX (US)

(72) Inventors: David Christopher Beck, Broken Arrow, OK (US); Walter Dinkins, Tulsa, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 613 days.

(21) Appl. No.: 16/920,349

(22) Filed: Jul. 2, 2020

(65) Prior Publication Data
US 2022/0003088 A1 Jan. 6, 2022

(51) Int. Cl.
  F04B 47/06 (2006.01)
  E21B 43/12 (2006.01)
  F04D 29/08 (2006.01)
  F04D 13/08 (2006.01)
  F04D 13/10 (2006.01)
  F04B 53/16 (2006.01)

(52) U.S. Cl.
  CPC ............ E21B 43/128 (2013.01); F04B 47/06 (2013.01); F04B 53/16 (2013.01); F04D 13/086 (2013.01); F04D 13/10 (2013.01); F04D 29/086 (2013.01); F05B 2240/57 (2013.01); F05B 2260/30 (2013.01)

(58) Field of Classification Search
  CPC ......... E21B 33/12–1216; E21B 43/128; F04D 13/10; F04B 47/00; F04B 47/06; H02K 5/132; B32B 2581/00
  See application file for complete search history.

(56) References Cited

U.S. PATENT DOCUMENTS

| 3,703,468 A | 11/1972 | Chess et al. |
| 4,446,038 A | 5/1984 | Schlicht et al. |
| 4,940,911 A | 7/1990 | Wilson |

(Continued)

FOREIGN PATENT DOCUMENTS

| CN | 1184195 | 1/2005 |
| CN | 102482591 | 5/2012 |

(Continued)

OTHER PUBLICATIONS

Non-Final Office Action, U.S. Appl. No. 16/920,337, dated Nov. 25, 2022, 10 pages.

(Continued)

Primary Examiner — Thomas Fink
(74) Attorney, Agent, or Firm — Kilpatrick Townsend & Stockton LLP

(57) ABSTRACT

An electric submersible pump includes a pump and an electric motor coupled to the pump. An electric submersible pump also includes a seal that is positioned between the pump and the electric motor. The seal has an outer housing and a seal bag internal to the outer housing. The seal bag has an outer layer and an inner layer. The outer layer is made from a first material to maintain the structure of the seal bag in a swellable state within the wellbore environment. The inner layer is made from a second material that can swell in response to contact with a polar substance and seal a tear in the outer layer of the seal bag.

13 Claims, 6 Drawing Sheets

(56) References Cited

U.S. PATENT DOCUMENTS

| | | | |
|---|---|---|---|
| 6,100,616 | A | 8/2000 | Heinig et al. |
| 7,198,723 | B2 | 4/2007 | Mcgarvey et al. |
| 7,367,400 | B1 | 5/2008 | Howell |
| 7,767,631 | B2 | 8/2010 | Levy |
| 7,980,233 | B2 | 7/2011 | Wagner et al. |
| 10,190,370 | B1* | 1/2019 | Taha .................. E21B 47/005 |
| 10,323,751 | B2 | 6/2019 | Wang et al. |
| 10,428,630 | B2 | 10/2019 | Bennett et al. |
| 2004/0029748 | A1 | 2/2004 | Levy |
| 2004/0136849 | A1 | 7/2004 | Du et al. |
| 2005/0087343 | A1 | 4/2005 | Du et al. |
| 2007/0027245 | A1* | 2/2007 | Vaidya ............... E21B 33/1208 |
| | | | 524/424 |
| 2007/0051510 | A1 | 3/2007 | Veneruso et al. |
| 2009/0309608 | A1* | 12/2009 | Huston .................. H01B 7/288 |
| | | | 324/527 |
| 2010/0204066 | A1 | 8/2010 | Ivan et al. |
| 2012/0321828 | A1* | 12/2012 | Jolley .................... C08L 75/02 |
| | | | 528/68 |
| 2014/0087977 | A1 | 3/2014 | Kim et al. |
| 2014/0154101 | A1 | 6/2014 | Gerrard et al. |
| 2014/0190706 | A1 | 7/2014 | Varkey et al. |
| 2014/0302735 | A1* | 10/2014 | Donovan ............. E02D 31/004 |
| | | | 156/332 |
| 2015/0226220 | A1 | 2/2015 | Bevington |
| 2015/0132158 | A1* | 5/2015 | Reeves ................... F04B 35/04 |
| | | | 417/410.1 |
| 2017/0015824 | A1 | 1/2017 | Gozalo et al. |
| 2017/0030171 | A1* | 2/2017 | Collins .................. F16J 15/324 |
| 2019/0256753 | A1* | 8/2019 | Barnhouse ............... C09K 3/12 |

FOREIGN PATENT DOCUMENTS

| | | |
|---|---|---|
| CN | 103459359 | 12/2013 |
| CN | 104302748 | 8/2017 |
| CN | 107956452 | 4/2018 |
| CN | 105189719 | 5/2018 |
| DE | 102010034758 | 2/2012 |
| EP | 0909872 | 4/1999 |
| ES | 2198490 | 2/2004 |
| JP | 2000239483 | 9/2000 |
| JP | 2002146376 | 5/2002 |
| JP | 2007039998 | 2/2007 |
| JP | 5739012 | 5/2015 |
| JP | 2018153765 | 10/2018 |
| KR | 19980033608 | 9/1998 |
| KR | 19980071961 | 10/1998 |
| KR | 20120102959 | 9/2012 |
| RO | 111107 | 6/1996 |
| RO | 119233 | 6/2004 |
| WO | 2008113021 | 9/2008 |
| WO | 2017096103 | 6/2017 |
| WO | 2017188834 | 11/2017 |

OTHER PUBLICATIONS

Application No. PCT/US2020/040786, International Search Report and Written Opinion, dated Mar. 29, 2021, 10 pages.

Kesslin et al., "Ortho Esters as Water Scavengers", I&EC Product Research and Development, vol. 5, No. 1, Mar. 1966, 3 pages.

* cited by examiner

SEAL BAG FOR SEAL OF AN ELECTRIC SUBMERSIBLE PUMP

TECHNICAL FIELD

The present disclosure relates generally to an electric submersible pump and, more particularly (although not necessarily exclusively), to a seal for use in an electric submersible pump for use in a wellbore.

BACKGROUND

In a hydrocarbon well, an electric submersible pump may be used to move wellbore fluid from downhole to the surface, such as by using artificial lift for hydrocarbon extraction. The electric submersible pump may be used to manage the pressure of the fluid or the flow of fluid extracted from the wellbore.

The electric submersible pump may contain one or more electric motors, one or more seals, and one or more pumps, and can be positioned downhole in a wellbore. The electric motor is susceptible to premature failure due to an electrical fault caused by infiltration of wellbore fluids into the electric motor. The infiltration of wellbore fluid into the motor can be a result of a seal failure during the operation of the electrical submersible pump.

DETAILED DESCRIPTION

Figure 1:
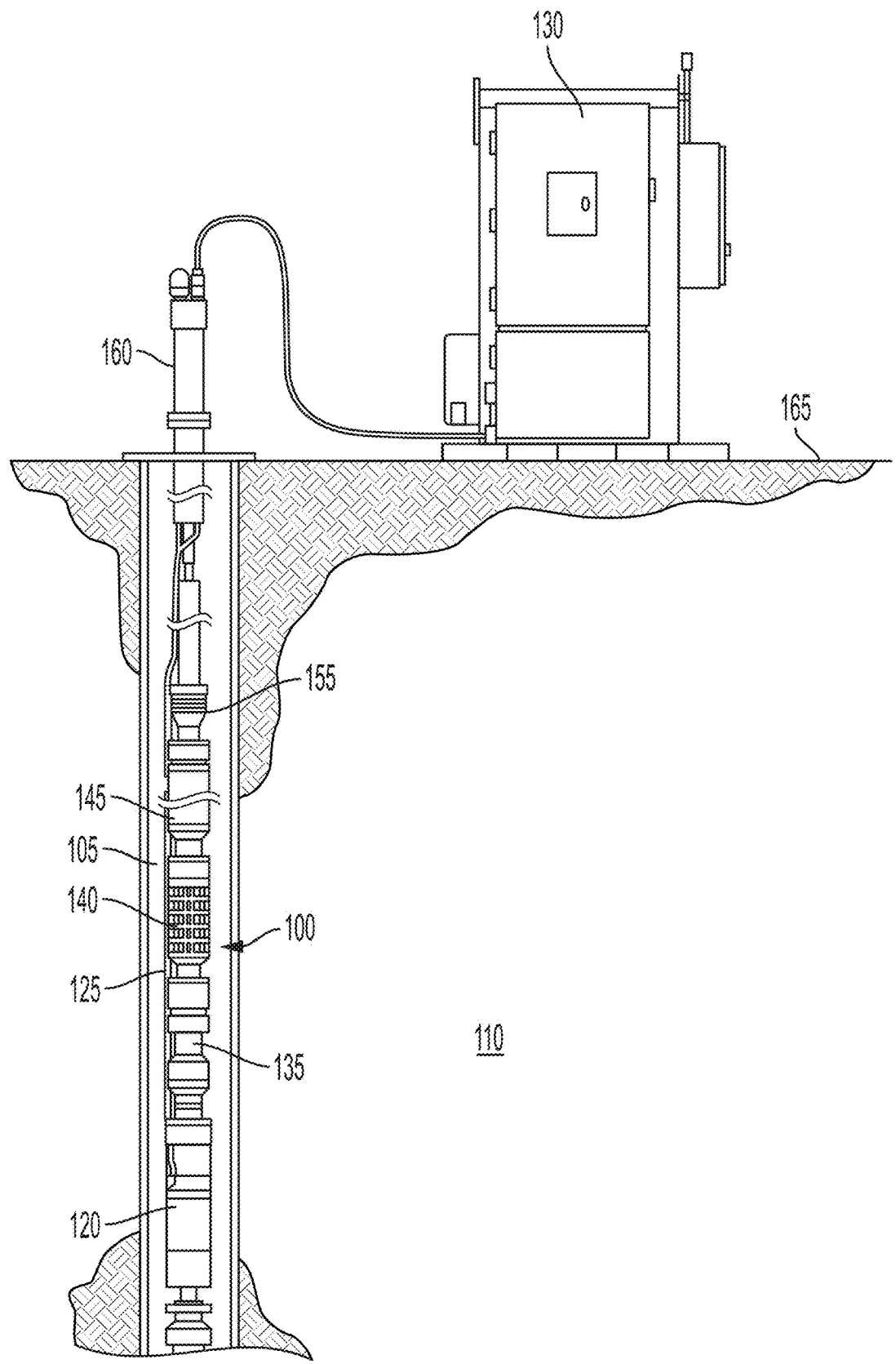
FIG. 1 is a schematic of a wellbore in which an electric submersible pump with a seal that includes a bag is positioned to communicate with surface equipment according to one example of the present disclosure.

Certain aspects and examples of the present disclosure relate to a seal bag that includes multiple layers and that can be used in a seal for an electric submersible pump. The multiple layers can include an inner layer and an outer layer. In case of a tear in the seal, the inner layer can swell to seal the tear against an outer housing of the seal and effectively self-heal the tear. For example, the inner layer may be exposed to motor oil in a chamber defined by the seal and the motor oil may be for an electric motor of the electric submersible pump. A tear may allow water or other polar substances into the chamber. A polar substance, of which water is an example, can be a covalently bonded substance that contains partially positive and negative charges. In response to contact with the water or other polar substance, the inner layer can expand, such as by swelling, against the outer layer and the outer housing to seal the tear.

The seal bag can provide a barrier to protect the electric motor and motor oil from contamination by the wellbore fluid. A tear may develop in the seal bag downhole that can result in wellbore fluid entering the chamber holding the motor oil. The seal bag may have the ability to self-heal when a tear develops in the seal bag. The ability to self-heal the tear can result in an increased functional life of the electric submersible pump and prevent tears from impeding the electric submersible pump from performing downhole operations.

For example, wellbore fluid that contaminates motor oil within the electric motor and seal of an electric submersible pump can cause the motor oil to degrade and can cause the electric submersible pump to fail due to electrical failure or improper bearing operation. A seal bag that fails, such as by having a tear, can provide a path for wellbore fluid ingress. An elastomer seal bag can be used that has multiple plies or layers as a positive barrier within the seal. In one example, an outer layer is resistant to water, other polar substances, and hydrocarbons in wellbore fluid. And, an inner layer can include a polymer that can swell in response to contact with water and polar substances. The seal bag can provide a self-healing capability to the elastomer seal bag and can increase resistance to wellbore fluid infiltrating the electric submersible pump due to a tear in the elastomer seal.

In an example, an elastomer seal bag can include multiple layers or plies and can be installed in a seal. The layers can include an outer layer that may be resistant to polar fluids and hydrocarbons found in wellbore fluid and can include an inner layer that may be a water-sensitive or polar-substance sensitive polymer that can swell. The seal can provide a positive barrier between wellbore fluid and oil contained within the seal. When the integrity of the outer layer of the elastomer seal bag is compromised, contact between the inner layer of the bag and water or other polar substance in the wellbore fluid can cause the polymer of the inner layer to swell to completely or partially seal the tear and prevent or slow the ingress of wellbore fluid into the seal. The self-healing quality of the elastomer seal bag can reduce the contamination of the oil contained within the seal. Using a multi-ply elastomer seal bag according to some examples can increase the resiliency of the seal section and can increase the electric submersible pump run-life. For example, when the integrity of the bag is compromised and the inner layer contacts wellbore fluid, the polymer material of the inner layer can swell as a result of the reaction to the wellbore fluid and can seal the tear in the seal bag.

In some examples, a seal bag includes layers in addition to the outer layer and the inner layer. For example, the seal bag may include an additional layer between the inner layer and outer layer that may provide stiffness, permeability resistance, or other beneficial effects to the characteristics of the elastomer bag. Or, the middle layer may be considered to be a first inner layer that is made from a material that swells in response to contact with polar substances. In that example, the inner layer may be considered to be a second inner layer that may be made from a material that swells in response to contact with polar substances or from a different material that does not swell. The first inner layer can be a layer to provide self-healing in case of a tear.

In addition or alternatively, a seal bag may have an outer layer with a slick or anti-stick surface that can promote movement of the seal bag along an inner surface of the seal housing and that may prevent friction coupling that can result in sticking and bunching of the bag that can lead to the tearing of the seal bag.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a schematic of a wellbore 105 in which an electric submersible pump 100, with a seal 135 that includes a bag, is positioned to communicate with surface equipment according to one example of the present disclosure. The wellbore 105 can be in a subterranean environment 110 and the electric submersible pump 100 may provide artificial lift to wellbore fluid by moving wellbore fluid from a position downhole to a surface 165 through a wellhead 160. Artificial lift can be employed during the production phase of a hydrocarbon well after subterranean pressures have abated and a free-flow stage of the well has ended. The electric submersible pump 100 in the wellbore 105 can provide artificial lift to maintain the production rate from the wellbore 105.

The electric submersible pump 100 can have an electric motor 120 coupled to a pump 145 by a shaft to provide mechanical power to the pump 145 from the electric motor 120. The pump 145 may have an intake 140 and a discharge 155. The intake 140 can allow the pump 145 to draw in wellbore fluid and direct the wellbore fluid toward the surface 165 through the discharge 155. The electric motor 120 may be electrically coupled to a variable speed controller 130 by a cable 125. The variable speed controller 130 can provide both power and control signals to the electric motor 120 through the cable 125. The variable speed controller 130 and the wellhead 160 may be positioned above the surface 165.

Between the pump 145 and the electric motor 120 is at least one seal 135 that can contain at least one seal bag positioned inside the seal 135. The seal 135 can transfer torque to the pump 145 from the electric motor 120. The seal 135 can prevent wellbore fluid from contaminating motor oil for the electric motor 120 through isolation, equalization, and expansion. The seal 135 may also prevent pump-shaft thrust from impacting motor performance through force absorption. The seal 135 and the seal bag can isolate the electric motor 120 from wellbore fluid that can otherwise cause electrical and mechanical faults of the electric motor 120.

Seal bags can be positioned in the seal 135 in one or more orientations. An example of an orientation is a series installation in which two or more seal bags can be positioned independently and can provide redundant isolation of the electric motor 120. Another example of an orientation is a parallel installation in which two or more bags may be coupled together. The parallel installation can allow greater expansion of the motor oil given certain conditions in the wellbore 105. And, a parallel installation can reduce the redundant isolation of the electric motor 120. In either orientation, the seal bag can include multiple layers that can self-heal a tear in the seal 135 in the downhole environment.

Figure 2:
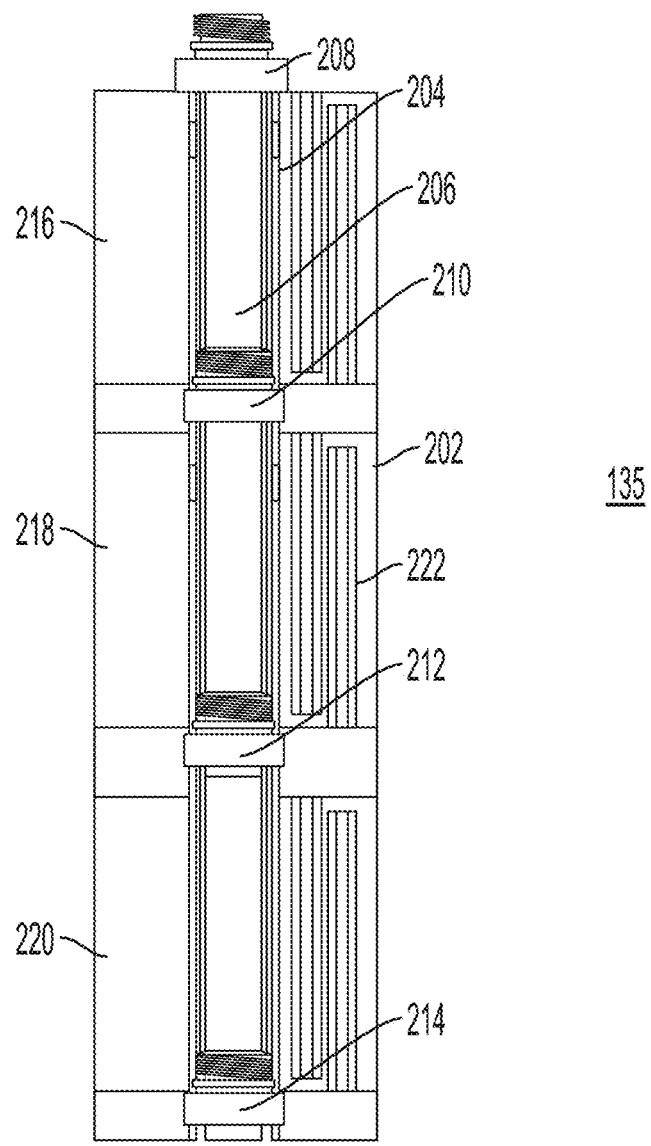
FIG. 2 is a partial cross-sectional schematic of a seal that can be installed in an electric submersible pump and that includes seal bags, each with multiple layers according to one example of the present disclosure.

FIG. 2 is a partial cross-sectional schematic of a seal 135 that can be installed in an electric submersible pump and that includes seal bags 216-220, each with multiple layers according to one example of the present disclosure. The seal 135 is depicted as having three sections defined between mechanical seals 208-214 and including seal bags 216-220. Each of the seal bags 216-220 is positioned within an outer housing 202. Although three seal bags 216-220 are shown in FIG. 2, a seal according to other examples can have any number of seal bags, including one bag, two bags, or more than three bags.

The seal sections can each include an interdigitated path, such as interdigitated path 222. An interdigitated path may also be referred to as a labyrinth chamber. The interdigitated path 222 may be located in the seal bag 220. In operation, the interdigitated path 222 may be filled with motor oil for an electric motor of an electric submersible pump. In the case of a tear, wellbore fluid may enter the seal 135 and displace the motor oil until the pressure between the two equalizes. The interdigitated path 222 can control the flow of wellbore fluid within the seal 135 for the purpose of limiting contamination of the motor oil with the wellbore fluid.

The seal 135 also includes a guide tube 204 in which is positioned a shaft 206. The shaft 206 can couple an electric motor to a pump of the electric submersible pump. The mechanical seals 208-214 can prevent fluid from entering the seal 135 around the shaft 206 through the guide tube 204. The seal bags 216-220 can further isolate the electric motor and prevent ingress of wellbore fluid due to the failure of one of the mechanical seals 208-214.

For example, the seal bags 216-220 may be elastomeric and can provide a barrier to isolate the wellbore fluid from the electric motor. In this example, the three sections in the seal 135 and the seal bags 216-220 may provide redundant protection for the electric motor 120. If one of the three sections fails, the electric motor can still function without contamination from wellbore fluid. The seal bags 216-220 in the sections may have the ability to self-heal according to some examples of the present disclosure. Each of seal bags 216-220 can include an inner layer and an outer layer. The outer layer may be resistant to polar fluids and hydrocarbons found in wellbore fluid. The inner layer may be material that is water-sensitive or otherwise sensitive to other polar substances and that can swell in response to contact with water or other polar substances. In an example, if one of the mechanical seals 208-214 fails, the seal section below the failed mechanical seal can fill with wellbore fluid. The seal bag in the failed section may develop a tear in the outer layer and the inner layer of the seal bag may be exposed to wellbore fluid. The inner layer may swell in response to the wellbore fluid to fill the tear. The inner layer can seal the tear in the outer layer preventing or limiting the ingress of wellbore fluid into the seal and can maintain isolation of the motor oil and motor from the wellbore fluid.

Figure 3:
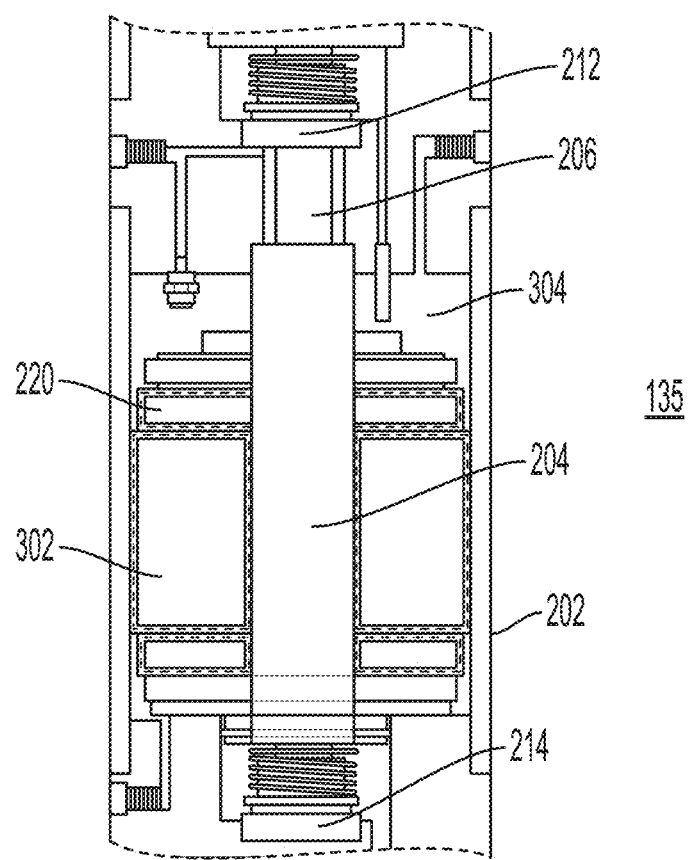
FIG. 3 is a cross-sectional schematic of a seal that includes a seal bag that has multiple layers according to one example of the present disclosure.

FIG. 3 is a cross-sectional schematic of a seal 135 that includes a seal bag 220 that has multiple layers according to one example of the present disclosure. The seal 135 can have an outer housing 202 that can be a pipe that may be bounded at each end by a head and a base. Check valves within the head and base can allow motor oil to move within the seal 135 for maintaining a constant and slightly positive pressure through the seal 135 relative to ambient wellbore pressure at the pump intake.

The seal bag 220 can be positioned inside the outer housing 202 in the seal section between mechanical seals 212, 214. A guide tube 204 can be positioned axially within the seal 135 and can define a cavity in which a shaft 206 can rotate to transfer power from the electric motor to the pump of an electric submersible pump. The seal bag 220 can be positioned around the guide tube 204. The guide tube 204 can provide a path for motor oil to fill the seal bag 220 and can maintain adequate clearance between the shaft 206 and the seal bag 220.

Motor oil can fill both an interior area 302 of the seal bag 220 and the external area 304 that is inside the outer housing 202 and external to the seal bag 220. If the mechanical seal 212 fails, the seal section between the mechanical seals 212 and 214 can be contaminated with wellbore fluid. In this example, the seal bag 220 can protect the next section of the seal 135 from being contaminated and can maintain the isolation of the motor oil and the electric motor from wellbore fluid.

The seal bag 220 has multiple layers. The outer layer may be resistant to polar fluids and hydrocarbons in wellbore fluid. The inner layer may be a water-sensitive or polar-substance sensitive polymer that can swell. If the seal bag 220 develops a tear in the outer layer, the inner layer of the seal bag 220 may be exposed to wellbore fluid. The inner layer may swell in response to contact with water or other polar substances and press the outer layer against the inside surface of the outer housing 202 to seal the tear. The response of the inner layer can seal the tear in the outer layer to prevent or limit the ingress of wellbore fluid into the seal bag 220.

Figure 4:
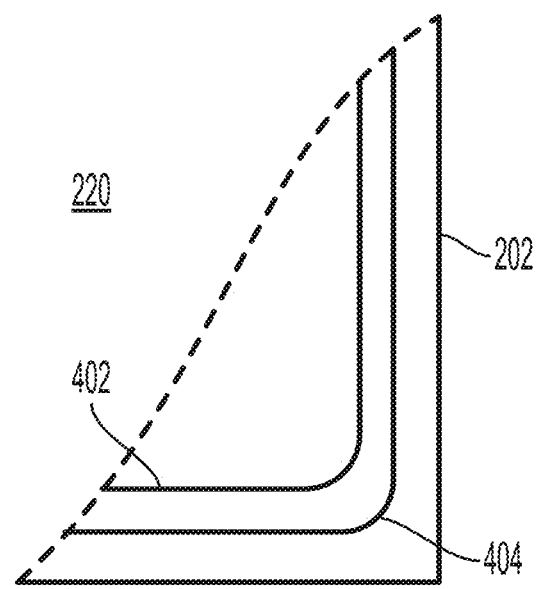
FIG. 4 is cross-sectional schematic of part of a seal that includes two layers of a seal bag and an outer housing according to one example of the present disclosure.

FIG. 4 is cross-sectional schematic of part of a seal that includes two layers of a seal bag 220 and an outer housing 202 according to one example of the present disclosure. The two layers include an inner layer 402 and an outer layer 404. Both the inner layer 402 and the outer layer 404 of the seal bag 220 can be positioned in an inner area defined by the outer housing 202 for an electric submersible pump. The outer layer 404 can be positioned adjacent to the outer housing 202 and between the outer housing 202 and the inner layer 402. In some examples, the inner layer 402 may be coupled to the outer layer 404. For example, the inner layer 402 and the outer layer 404 can be formed together in a mold or die. In other examples, the inner layer 402 and outer layer 404 may be separate layers that are uncoupled and can be assembled, with the inner layer 402 inside the outer layer 404, and mounted within the seal. In still other examples, the inner layer 402 and the outer layer 404 are formed by different single-layer bags with one bag being the inner layer 402 and the other bag being the outer layer 404.

The outer layer 404 can be made from an elastomeric material that may swell in response to wellbore fluids, gases, pressure changes, or temperature changes. The elastomeric material can be capable of swelling and deswelling multiple times while maintaining its integrity, such as by maintaining fluid isolation properties in both the swell and deswell states. Examples of the elastomeric material from which the outer layer 404 can be made include AFLAS®, Viton®, Highly Saturated Nitrile (HSN), styrene butadiene, acrylonitrile butadiene rubber, hydrogenated acrylonitrile butadiene rubber, carboxlyated acrylonitrile butadiene rubber, ethylene vinyl acetate, ethylene acrylate, vinyl methyl silicone, Hypalon®, ethylene copolymer, tetrafluoroethylene propylene, ethylene propylene diene monomer, and combinations of these or other suitable materials. The inner layer 402 can be made from a polymer that may be resistant to motor oil and that may swell in response contact with water and other polar substances. Examples of polymers from which the inner layer 402 may be made include a hydrophobic polymer, a polymer blend with crosslinked hydrogel such as polyacrylate, polyvinyl alcohol, polyethylene oxide, starch-acrylate copolymer, carboxymethyl cellulose, or combinations of these or other suitable material.

A tear in the seal bag 220, such as a tear in the outer layer 404, may allow wellbore fluid to enter into an inner area defined by the inner layer 402. The inner layer 402 can respond to contact with water or other polar substances in the wellbore fluid by swelling toward the outer layer 404 and the outer housing 202. The swelling inner layer 402 may force the outer layer 404 against the outer housing 202 and seal the tear in the seal bag 220 by preventing wellbore fluid from entering the inner area defined by the inner layer 402. The ability of the inner layer 402 of the seal bag to swell in response to polar substances and fill a tear in the seal bag 220 can provide the seal bag 220 the ability to self-heal a tear in the seal bag 220 in the downhole environment.

In some examples, the outer layer 404 may include a surface facing the outer housing 202 and the surface can include a slick or anti-stick substance that can promote movement of the seal bag 220 along an inner surface of the outer housing 202 and that may prevent friction coupling. Friction coupling can include a coupling between the outer layer 404 and the outer housing 202 due to resistance between the two components. Friction coupling between the outer layer 404 and the outer housing 202 can result in the seal bag 220 sticking and bunching, that can lead to the seal bag 220 tearing. The slick or anti-slick substance, such as Teflon®, can be used to prevent or reduce friction coupling. In addition or alternatively, the outer housing 202 can include a substance, such as Teflon®, on an inner surface of the outer housing 202 to prevent or reduce friction coupling with the outer layer 404.

Figure 5:
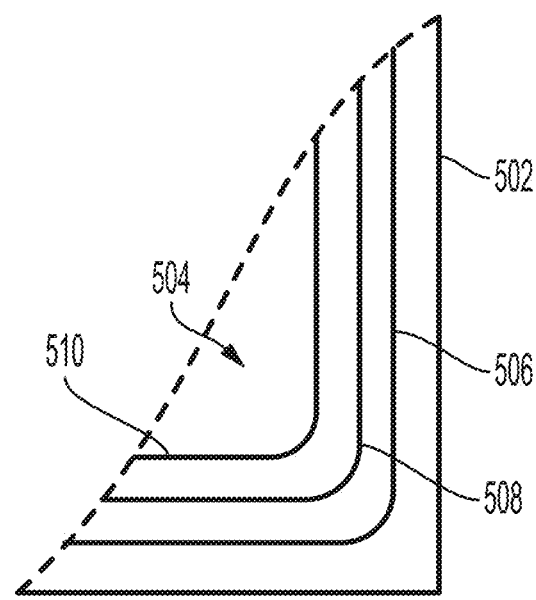
FIG. 5 is cross-sectional schematic of a seal that includes more than two layers of a seal bag and an outer housing according to one example of the present disclosure.

FIG. 5 is cross-sectional schematic of a seal that includes more than two layers of a seal bag 504 and an outer housing 502 according to one example of the present disclosure. The layers of the seal bag 504 can be positioned within an inner area defined by the outer housing 502 of the seal for an electric submersible pump. The seal bag 504 layers include: an outer layer 506, an inner layer 510, and at least one middle layer 508. The outer layer 506 and the inner layer 510 may be the same or similar to the inner layer 402 and the outer layer 404 of FIG. 4. The outer layer 506 can be positioned adjacent to the inside surface of the outer housing 502 and between the outer housing 502 and the middle layer 508. The middle layer 508 is positioned between the inner layer 510 and the outer layer 506 of seal bag 504. The middle layer 508 may be made from a material that can add stiffness, other structural support, permeability resistance, or other beneficial effects to the seal bag 504. An inner layer 510 may be made from a polymer that may be resistant to motor oil and that may respond to water and other polar substances by swelling.

In one example, if the seal integrity is compromised, wellbore fluid may infiltrate seal bag 504. A tear in the outer layer 506 and the middle layer 508 of the seal bag 504 can allow wellbore fluid to penetrate to the inner layer 510 that can swell in response to a polar substance, such as water, in the wellbore fluid. The inner layer 510 can swell into the tear in the outer layer 506 and the middle layer 508 to force the outer layer 506 against the inner surface of the outer housing 502 and seal the tear. Sealing the tear can reduce or prevent the motor oil from being contaminated and can reduce or prevent the electric motor from failing from contaminated motor oil. The middle layer 508 of seal bag 504 may be one layer or more than one layer. The middle layer 508 may be coupled to at least one of the inner layer 510 or the outer layer 506. Alternatively, the middle layer 508 may be assembled with the inner layer 510 and the outer layer 506 as separate bags to form the seal bag 504.

In some examples, the middle layer 508 is a tape or a mesh material that can support the structure of the seal bag 504 during swell and deswell. An example of the tape material can be Teflon® or other suitable tape. An example of the mesh material may be a nylon mesh or other mesh material that can provide structural support.

In other examples, the middle layer 508 can be a material that can support permeability resistance of the seal bag 504. For example, the middle layer 508 can be a material similar to that of the outer layer 506 that is resistant to wellbore fluid and that provides additional protection to the inner layer 510.

In still other examples, the middle layer 508 can be a liquid contained between the inner layer 510 and the outer layer 506 that responds to water and other polar substances by swelling. The liquid that forms the middle layer 508 may aid the inner layer 510 in sealing a tear in the outer layer 506. In another example, the middle layer 508 can be a liquid that may swell when exposed to water and other polar substances in the wellbore fluid. The inner layer 510 in this example may be similar to the outer layer 506 in material and function. If a tear forms in the outer layer 506 of the seal bag 504, the middle layer 508 can swell in response to the polar substances in the wellbore fluid and fill the tear in the outer layer 506.

Figure 6:
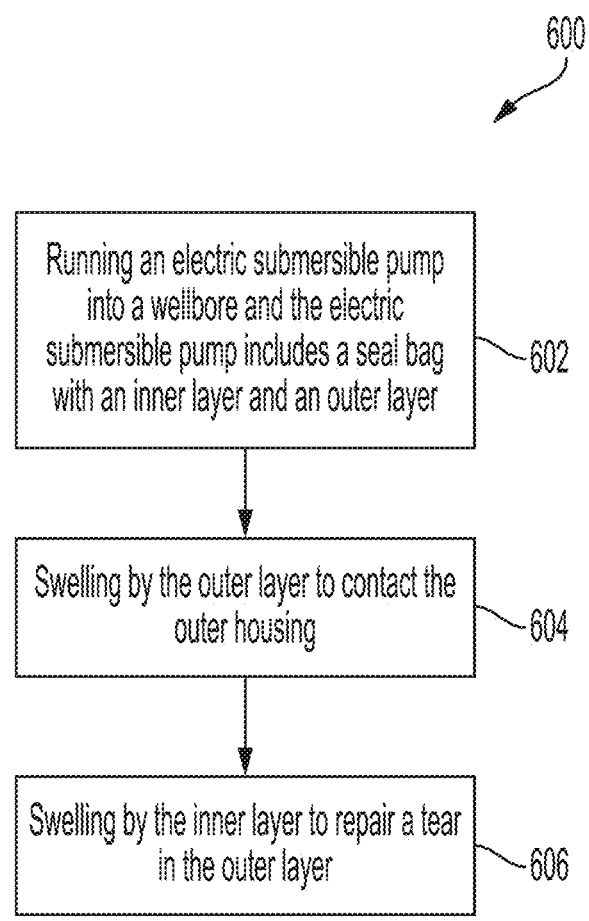
FIG. 6 is a flowchart of a process for sealing a tear in an outer layer of a seal bag with an inner layer according to one example of the present disclosure.

FIG. 6 is a flowchart of a process 600 for sealing a tear in an outer layer of a seal bag with an inner layer according to one example of the present disclosure. In block 602, an electric submersible pump is run downhole into a wellbore. The electric submersible pump can be run downhole using a conveyance mechanism such as coiled tube or wireline. The electric submersible pump can include an electric motor and a pump coupled by a shaft that transmits power from the electric motor to the pump. The electric motor can power the pump so that the pump provides artificial lift for the wellbore. A seal can be positioned between the electric motor and the pump. The seal can include a seal bag that has an inner layer and an outer layer in an outer housing. The seal bag may contain the inner layer and the outer layer, or may include one or more layers in addition to the inner layer and the outer layer. The seal including the seal bags can isolate the electric motor from wellbore fluids.

In block 604, the outer layer of a seal bag swells to contact the inner surface of the outer housing of the seal. The outer layer of the seal bag may be an elastomeric material and can swell and deswell in response to pressure changes, temperature changes, or exposure to wellbore fluid or gases. During pump operation, the outer layer of the seal bag can swell to contact an inner surface of the outer housing of the seal that is a section of a pipe. The outer housing provides structural support for the bag to limit the swell of the bag.

In block 606, the inner layer of a seal bag swells to repair a tear in the outer layer. During operation of the electric submersible pump, the outer layer of the seal bag can experience a cycle of swell and deswell that can cause the elastomeric material of the outer layer to tear. The tear can expose the inner layer of the bag to wellbore fluid. The inner layer of the seal bag may be a material that responds to polar substances in the wellbore fluid by swelling. The inner layer of the seal bag can swell into the tear to seal the tear in the outer layer and press the outer layer against the inner surface of the outer housing of the seal. This self-heal action can prevent or restrict the contamination by wellbore fluid of the motor oil and electric motor of the electric submersible pump.

In some aspects, electric submersible pumps, seals, and methods for self-healing tears in a seal bag are provided according to one or more of the following examples:

Example 1 is an electric submersible pump, comprising: a pump; an electric motor that is coupled to the pump; and a seal positioned between the pump and the electric motor, the seal having an outer housing and a seal bag internal to the outer housing, the seal bag including an outer layer and an inner layer, the outer layer being made from a first material to retain a structure of the outer layer in a swellable state in a wellbore, the inner layer being made from a second material that is swellable in the wellbore in response to contact with a polar substance to seal a tear in the outer layer.

Example 2 is the electric submersible pump of example 1, wherein the outer layer of the seal bag has a surface to prevent friction coupling of the outer layer in the swellable state to an inside surface of the outer housing.

Example 3 is the electric submersible pump of example 1, wherein the seal bag includes a middle layer between the inner layer and the outer layer.

Example 4 is the electric submersible pump of example 3, wherein the middle layer is at least one of a mesh material or a tape material.

Example 5 is the electric submersible pump of example 3, wherein the middle layer is a liquid.

Example 6 is the electric submersible pump of example 1, wherein the outer layer is positioned between the inner layer and the outer housing, wherein the outer layer is swellable to the swellable state to contact the outer housing, wherein the inner layer is swellable in response to contact with the polar substance to exhibit a force on the outer layer toward the outer housing to seal the tear in the outer layer to prevent fluid from the wellbore from contacting the electric motor.

Example 7 is the electric submersible pump of example 6, wherein the seal bag defines a chamber in which a shaft is positioned to provide mechanical communication between the electric motor and the pump.

Example 8 is the electric submersible pump of example 1, wherein the outer housing has an inside surface with a coating to prevent friction coupling between the inside surface of the outer housing and the outer layer.

Example 9 is a seal comprising: an outer housing positionable between a pump and an electric motor of an electric submersible pump; and a seal bag internal to the outer housing, the seal bag including an outer layer and an inner layer, the outer layer being made from a first material to retain a structure of the outer layer in a swellable state in a wellbore, the inner layer being made from a second material that is swellable in the wellbore in response to contact with a polar substance to seal a tear in the outer layer.

Example 10 is the seal of example 9, wherein the outer layer of the seal bag has a surface to prevent friction coupling of the outer layer in the swellable state to an inside surface of the outer housing of the seal.

Example 11 is the seal of example 9, wherein the seal bag includes a middle layer between the inner layer and the outer layer.

Example 12 is the seal of example 9, wherein the outer layer is positioned between the inner layer and the outer housing, wherein the outer layer is swellable to the swellable state to contact the outer housing, wherein the inner layer is swellable in response to contact with the polar substance to exhibit a force on the outer layer toward the outer housing to seal the tear in the outer layer to prevent fluid from the wellbore from contacting the electric motor.

Example 13 is the seal of example 9, wherein the outer layer is made from an elastomeric, wherein the inner layer is made from a polymer that includes at least one of a hydrophobic polymer or a polymer blend with crosslinked hydrogel.

Example 14 is the seal of example 9, wherein the seal bag defines a chamber within the seal through which a shaft is positionable to provide mechanical communication between an electric motor and a pump.

Example 15 is a method comprising: running an electric submersible pump into a wellbore, the electric submersible pump including a pump, an electric motor coupled to the pump, and a seal, the seal including an outer housing and a seal bag internal to the outer housing, the seal bag including an outer layer and an inner layer; swelling, by the outer layer while retaining a structure of the outer layer, to contact the outer housing; and swelling, by the inner layer, to seal a tear in the outer layer in response to the inner layer contacting a polar substance.

Example 16 is the method of example 15, wherein swelling, by the outer layer while retaining the structure of the outer layer, to contact the outer housing comprises: preventing friction coupling between the outer layer and an inside surface of the outer housing by a surface of the outer layer.

Example 17 is the method of example 15, wherein the seal bag further includes a middle layer between the inner layer and the outer layer.

Example 18 is the method of example 15, wherein the outer layer is positioned between the inner layer and the outer housing, wherein swelling, by the inner layer, to seal the tear in the outer layer in response to the inner layer contacting the polar substance comprises the inner layer exhibiting a force on the outer layer toward the outer housing to seal the tear in the outer layer to prevent fluid from the wellbore from contacting the electric motor.

Example 19 is the method of example 15, further comprising: preventing, by a coating on an inside surface of the outer housing, the inside surface of the outer housing from forming a friction coupling with the outer layer.

Example 20 is the method claim 15, further comprising: mechanically coupling, by a shaft within a chamber defined by the seal bag, the electric motor to the pump.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. An electric submersible pump, comprising:
a pump;
an electric motor that is coupled to the pump; and
a seal positioned between the pump and the electric motor, the seal having an outer housing and a seal bag internal to the outer housing, the seal bag including an outer layer and an inner layer, the outer layer being made from a first material to retain a structure of the outer layer in a swellable state in a wellbore, the inner layer being made from a second material that is swellable in the wellbore in response to contact with a polar substance to seal a tear in the outer layer, wherein the outer layer has a surface that comprises a third material to prevent friction coupling of the outer layer in the swellable state to an inside surface of the outer housing, the third material different than the first material and the second material.

2. The electric submersible pump of claim 1, wherein the seal bag includes a middle layer between the inner layer and the outer layer.

3. The electric submersible pump of claim 2, wherein the middle layer is at least one of a mesh material or a tape material.

4. The electric submersible pump of claim 2, wherein the middle layer is a liquid.

5. The electric submersible pump of claim 1, wherein the outer layer is positioned between the inner layer and the outer housing, wherein the outer layer is swellable to the swellable state to contact the outer housing, wherein the inner layer is swellable in response to contact with the polar substance to exhibit a force on the outer layer toward the outer housing to seal the tear in the outer layer to prevent fluid from the wellbore from contacting the electric motor.

6. The electric submersible pump of claim 5, wherein the seal bag defines a chamber in which a shaft is positioned to provide mechanical communication between the electric motor and the pump.

7. The electric submersible pump of claim 1, wherein the outer housing has an inside surface with a coating to prevent friction coupling between the inside surface of the outer housing and the surface of the outer layer.

8. A method comprising:
running an electric submersible pump into a wellbore, the electric submersible pump including a pump, an electric motor coupled to the pump, and a seal, the seal including an outer housing and a seal bag internal to the outer housing, the seal bag including an outer layer and an inner layer, wherein the outer layer has a surface that comprises a material that prevents friction coupling of the outer layer in a swellable state to an inside surface of the outer housing, the material different than materials of the outer layer and of the inner layer;
swelling, by the outer layer while retaining a structure of the outer layer, to contact the outer housing; and
swelling, by the inner layer, to seal a tear in the outer layer in response to the inner layer contacting a polar substance.

9. The method of claim 8, wherein swelling, by the outer layer while retaining the structure of the outer layer, to contact the outer housing comprises:
preventing friction coupling between the outer layer and an inside surface of the outer housing by the surface of the outer layer.

10. The method of claim 8, wherein the seal bag further includes a middle layer between the inner layer and the outer layer.

11. The method of 8, wherein the outer layer is positioned between the inner layer and the outer housing,
wherein swelling, by the inner layer, to seal the tear in the outer layer in response to the inner layer contacting the polar substance comprises the inner layer exhibiting a force on the outer layer toward the outer housing to seal the tear in the outer layer to prevent fluid from the wellbore from contacting the electric motor.

12. The method of claim 8, further comprising:
preventing, by a coating on an inside surface of the outer housing, the inside surface of the outer housing from forming a friction coupling with the outer layer.

13. The method claim 8, further comprising:
mechanically coupling, by a shaft within a chamber defined by the seal bag, the electric motor to the pump.

* * * * *